United States Patent
Kenkare et al.

(10) Patent No.: US 6,991,679 B2
(45) Date of Patent: Jan. 31, 2006

(54) MULTIPLE FEED APPLICATOR ASSEMBLY FOR COATING OPTICAL FIBERS

(75) Inventors: Nirupama Kenkare, Tucker, GA (US); Robert C. Moore, Roswell, GA (US); Mahmood Tabaddor, Alpharetta, GA (US); Jason W. Shiroishi, Decatur, GA (US)

(73) Assignee: Fitel USA Corporation, Norcross, GA (US)

( * ) Notice: Subject to any disclaimer, the term of this patent is extended or adjusted under 35 U.S.C. 154(b) by 259 days.

(21) Appl. No.: 10/376,898

(22) Filed: Feb. 28, 2003

(65) Prior Publication Data

US 2004/0170758 A1    Sep. 2, 2004

(51) Int. Cl.
*B05C 11/02*    (2006.01)

(52) U.S. Cl. .............................. 118/125; 118/DIG. 18
(58) Field of Classification Search ................ 118/420, 118/125, DIG. 18, 411; 425/113; 427/163.2
See application file for complete search history.

(56) References Cited

U.S. PATENT DOCUMENTS

| | | | |
|---|---|---|---|
| 4,448,484 A | 5/1984 | Lombardi et al. ........ 350/96.23 |
| 4,474,830 A | * 10/1984 | Taylor .......................... 427/513 |
| 4,510,884 A | 4/1985 | Rosebrooks ................ 118/405 |
| 4,690,503 A | * 9/1987 | Janssen et al. .............. 385/128 |
| 4,851,165 A | 7/1989 | Rennell, Jr. et al. ......... 264/1.5 |
| 5,377,292 A | 12/1994 | Bartling et al. ............. 385/128 |
| 5,885,652 A | 3/1999 | Abbott, III et al. ....... 427/163.2 |
| 5,976,611 A | 11/1999 | Okuno et al. .................. 427/8 |
| 6,030,664 A | 2/2000 | DiMarcello et al. ........ 427/402 |
| 6,284,046 B1 | 9/2001 | Orita et al. ................. 118/405 |

FOREIGN PATENT DOCUMENTS

| | | |
|---|---|---|
| EP | 0462951 | 12/1991 |
| GB | 2179270 | 3/1987 |
| JP | WO 02/059652 | 8/2002 |
| JP | 2002255589 | 11/2002 |

OTHER PUBLICATIONS

Search Report Communication dated Jul. 13, 2004.

* cited by examiner

*Primary Examiner*—Brenda A. Lamb
(74) *Attorney, Agent, or Firm*—Thomas, Kayden, Horstemeyer & Risley LLP

(57) ABSTRACT

An apparatus for applying a primary coating and a secondary coating to an optical fiber is disclosed. The apparatus includes at least one pressurized source of primary coating, a first primary reservoir for applying a first layer of the primary coating to the optical fiber, a first primary die including a first primary land configured to size the first layer of the primary coating, a second primary reservoir for applying a second layer of the primary coating to the optical fiber, a second primary die including a second primary land, a pressurized source of the secondary coating, a secondary reservoir for applying a layer of the secondary coating to the optical fiber, and a secondary die including a secondary land configured to size the layer of the secondary coating.

6 Claims, 11 Drawing Sheets

MULTIPLE FEED APPLICATOR ASSEMBLY FOR COATING OPTICAL FIBERS

TECHNICAL FIELD

The present invention generally relates to coating optical fibers. More particularly, the present invention relates to an apparatus for applying multiple coatings to an optical fiber.

BACKGROUND OF THE INVENTION

Optical fiber production generally involves drawing a fiber, which usually is composed of silica glass, and then applying protective coating materials to the fiber. The primary layer typically comprises a relatively soft polymeric material that protects the fiber from displacement, and subsequent losses associated therewith. As well, the primary layer helps to absorb forces applied to the coated fiber and prevent their transmission to the fiber core. Typically, a secondary layer comprising a higher modulus polymeric material is applied to the primary layer. The secondary layer maintains high strength and abrasion resistance of the coated optical fiber. Each fiber thus coated must be capable of withstanding, over its entire length, a stress level to which the fiber will be exposed during installation and service. The coating also functions to prevent airborne particles from impinging upon and adhering to the surface of the drawn fiber, which can weaken the fiber and affect its transmission properties. As well, applying coating to the drawn fiber prevents surface abrasions, which can occur as a result of subsequent manufacturing processes as well as handling during installation.

Optical fibers can be coated using a wet coating process which typically involves drawing a fiber through a reservoir of liquid polymer material and then curing the liquid polymer to harden it by exposure to curing radiation, such as, ultra-violet light. In a dual coating process, the coatings are applied in tandem or simultaneously (within the same applicator or die assembly). The tandem arrangement applies a primary coating layer which is then cured, and then a secondary coating layer is applied and cured. In a simultaneous dual coating arrangement, both coats are applied after which they are cured. In both cases, the primary coating is typically a low modulus polymeric material and the second coating is a relatively high modulus polymeric material. For ease of description, only simultaneous dual coating arrangements are discussed.

As would be expected, from the manufacturing standpoint, it is desirable to produce the maximum amount of coated optical fiber for a given period of time, while maintaining quality standards. As such, maximizing draw speeds of the optical fibers is a primary goal of the manufacturing process. As the draw speed, or fiber velocity, is increased, the flow of the primary and the secondary coatings must be increased to maintain the diameters of those coatings. Typically, in a simultaneous dual coating arrangement, the secondary coating flow rate is comparatively easy to adjust, as either the pressure, or the diameter of the secondary die land can be increased with comparatively few tradeoffs. As would be imagined, it is less time consuming and requires less effort to adjust pressure than to adjust the diameter of the secondary die land. Therefore, it is desirable to select a secondary die land of a given diameter that can accommodate a range of draw speeds, and adjust pressure as required for the varying draw speeds. This is possible because centering of the optical fiber within the dual coating apparatus is maintained in the portion of the apparatus that applies the primary coating. Centering of the optical fiber within the primary coating portion of the dual coating apparatus is accomplished by utilizing the viscoelastic forces created by the polymeric primary coating as it passes through the primary coating land. These viscoelastic forces are maximized by maintaining the diameter of the primary land as small as possible while still maintaining the desired primary coating diameter.

A number of factors affect the primary coating diameter through the primary land, those being the pressure at which the primary coating is applied, the diameter of the primary coating land, the temperature of the optical fiber, the temperature of the primary coating, and the speed at which the fiber is drawn through the land. Adjusting any of these factors, either alone or in combination, creates drawbacks from a manufacturing standpoint. For example, increasing the application pressure of the primary coating tends to reduce centering forces. As well, adjusting the pressure of the primary coating is largely ineffective for increasing the primary coating flow rate, as the flow rate tends to be controlled by drag force due to the relatively small diameter of the primary coating land. Increasing the diameter of the primary land increases the flow rate of the primary coating. However, as the primary land diameter is increased, the viscoelastic forces created within the primary land are reduced, therefore reducing the forces used to center the optical fiber within the apparatus. Reduced centering forces often lead to non-concentric coatings and coating defects. To increase the drag force between the optical fiber and the primary coating, either the coating temperature or the fiber temperature may be reduced. However, reducing the temperatures of the optical fiber and the primary coating requires the increased use of helium (frequently used for cooling). Greater helium consumption translates into increased manufacturing costs, as helium is expensive.

Another problem common to existing dual coating apparatus is that as the draw speed of the optical fiber is increased the ramp scrap, or unusable fiber, is increased. This is largely due to the fact that existing primary coating lands are sized such that the desired primary coating diameter will be achieved for the given optical fiber velocity. The other factors being constant (coating pressure, fiber temperature, coating temperature, etc.), typical primary coating lands can only accommodate a narrow range of draw speeds, such as 15% of the design speed. For example, the primary coating land sized for an optical fiber draw speed of 25 meter/second (m/sec) may only produce good fiber that is drawn between 21 and 25 m/sec. Optical fiber drawn at speeds outside of this narrow range will potentially have primary coatings that are not within acceptable limits. A greater range would require additional helium consumption, as noted above, to reduce the optical fiber temperature and therefore increase the primary coating flow.

From the foregoing, it can be appreciated that it would be desirable to have a simple, less expensive, and effective apparatus for coating optical fibers, thereby facilitating the production of optical fiber at increased draw speeds while maintaining the desired primary coating diameters.

SUMMARY OF THE INVENTION

Briefly described, the present invention provides an apparatus and a method for applying a primary coating and a secondary coating to an optical fiber. A representative embodiment of the applicator assembly includes at least one pressurized source of primary coating, a first primary reservoir for applying a first layer of the primary coating to the optical fiber, a first primary die including a first primary land configured to size the first layer of the primary coating, a second primary reservoir for applying a second layer of the primary coating to the optical fiber, a second primary die including a second primary land, a pressurized source of the secondary coating, a secondary reservoir for applying a layer of the secondary coating to the optical fiber, and a secondary die including a secondary land configured to size the layer of the secondary coating.

The applicator assembly for applying a primary coating and a secondary coating to an optical fiber can also be viewed as a method of applying a primary coating and a secondary coating to an optical fiber. In this regard, a representative method can be broadly summarized by the following steps: applying a first layer of the primary coating to the optical fiber, applying a second layer of the primary coating to the first layer of the primary coating, and applying a layer of the secondary coating to the second layer of the primary coating.

Other systems, methods, features and advantages of the applicator assembly for applying a primary coating and a secondary coating to an optical fiber will be or become apparent to one with skill in the art upon examination of the following drawings and detailed description. It is intended that all such additional systems, methods, features, and advantages be included within this description, be within the scope of the applicator assembly, and be protected by the accompanying claims.

BRIEF DESCRIPTION OF THE DRAWINGS

The applicator assembly can be better understood with reference to the following drawings. The components in the drawings are not necessarily to scale, emphasis instead being placed upon clearly illustrating the principles of the applicator assembly. Moreover, in the drawing, like reference numerals designate corresponding parts throughout the several views.

Figure 1:
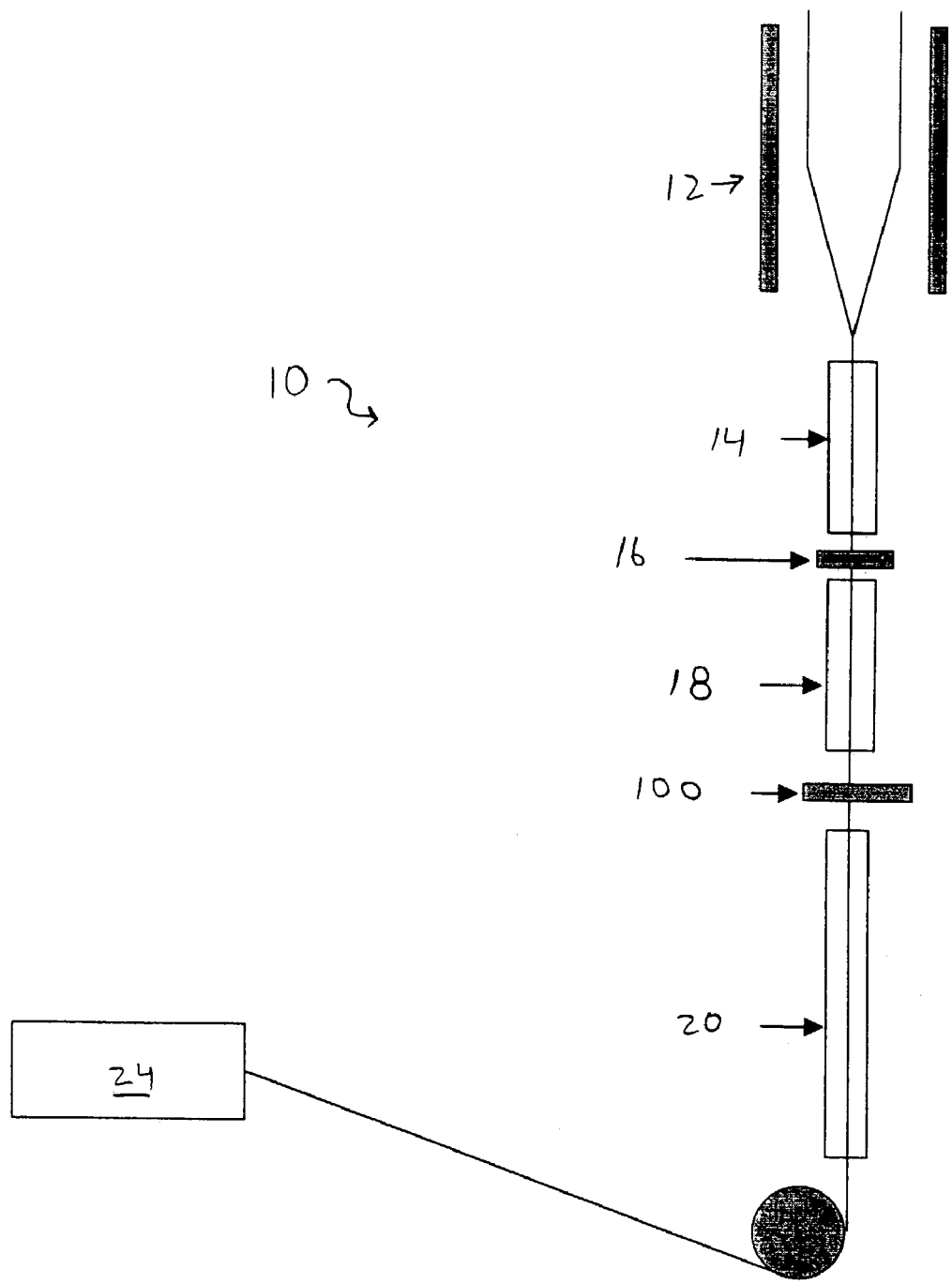
FIG. 1 is a schematic diagram of a system for applying coatings to optical fibers, including a preferred embodiment of the applicator assembly of the present invention.

Reference will now be made in detail to the description of the applicator assembly as illustrated in the drawings. While the applicator assembly will be described in connection with these drawings, there is no intent to limit it to the embodiment or embodiments disclosed therein. On the contrary, the intent is to cover all alternatives, modifications and equivalents included within the spirit and scope of the applicator assembly as defined by the appended claims.

DETAILED DESCRIPTION OF THE PREFERRED EMBODIMENT

Referring now in more detail to the drawings, FIG. 1 shows a system 10 which is used to draw an optical fiber 13 from a cylindrical preform 11 and then coat the optical fiber 11 utilizing a preferred embodiment of multiple feed applicator assembly 100 according to the present invention. Typically, optical fiber 13 manufacture begins by drawing the glass preform 11 that is held in a furnace 12 at a temperature of 2000° C. or higher. Instruments 16 such as cladding diameter and fiber tension gauges provide feedback to the furnace temperature and draw capstan speed controllers (not shown). The fiber 13 passes through several cooling stages, such as an annealer 14 and a chiller 18, that control the axial temperature profile of the fiber 13 within a desirable range. When the fiber 13 has cooled enough, typically to less than 80° C., two protective liquid coatings are applied with the multiple feed applicator assembly 100. Note, although two protective coatings are typical, various numbers of protective coatings can be applied with the multiple feed applicator assembly 100. Next, the coatings are cured, typically in ultraviolet ovens 20, and the optical fiber 13 is wound onto a takeup spool (not shown).

Figure 2:
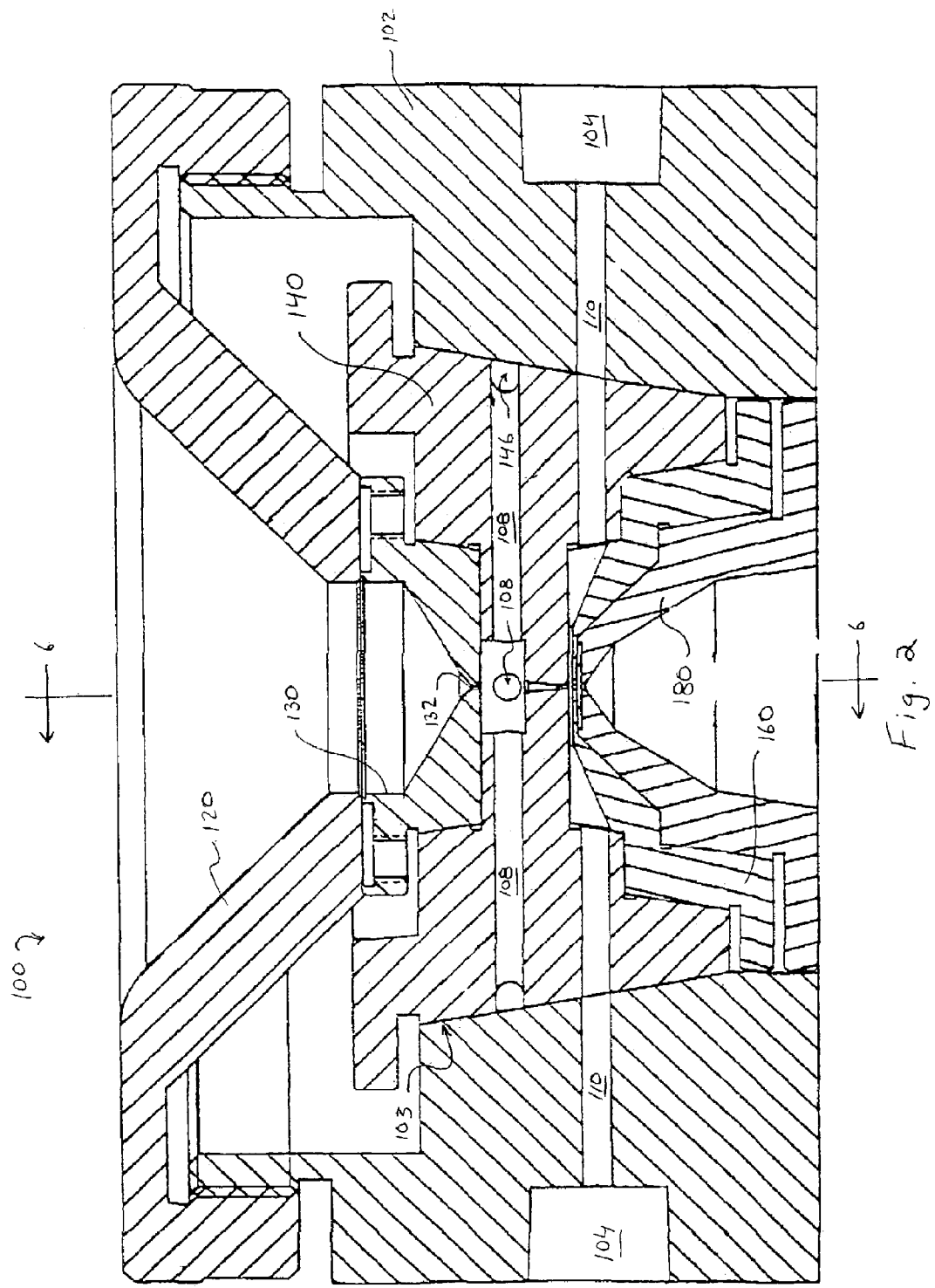
FIG. 2 is a cross-sectional view of a preferred embodiment of the applicator assembly of the present invention.
Figure 6:
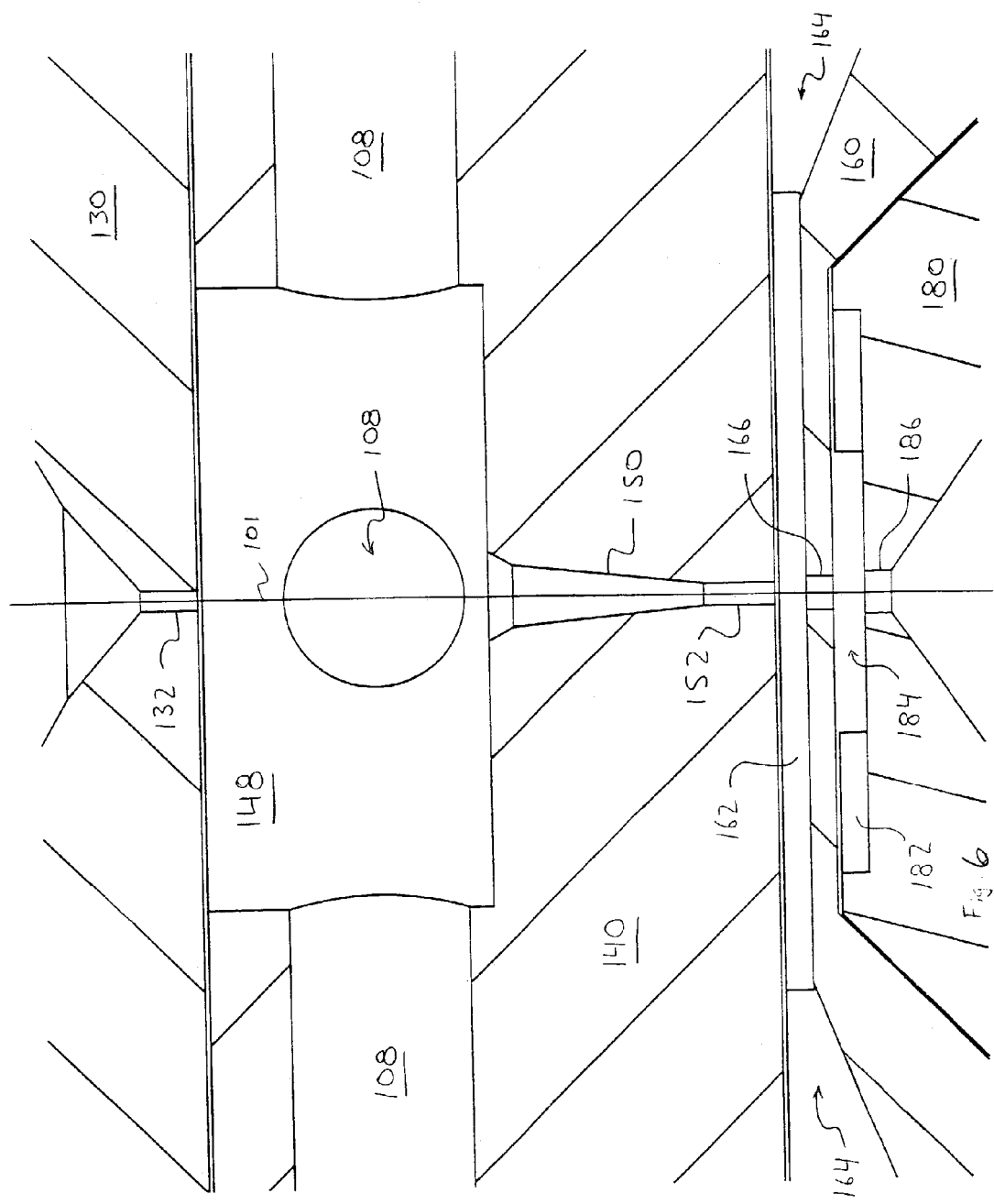
FIG. 6 is a partial cross-sectional view of a portion of the applicator assembly as shown in FIG. 2.

FIG. 2 illustrates, in cross section, the multiple feed applicator assembly 100 for coating optical fibers as shown in FIG. 1. For clarity, an optical fiber to be coated has not been shown passing through the applicator assembly 100. However, as shown in FIG. 6, an optical fiber 101 to be coated passes along the center line of the entry land 132, the first primary land 152, the second primary land 166, and the secondary land 186. As assembled, the applicator assembly 100 includes a die cap 120, an entry die 130, a first primary die 140, a second primary die 160, a secondary die 180, and a body portion 102. In the preferred embodiment shown, the body portion 102 includes a cavity 103 having tapered walls for receiving and supporting the first primary die 140.

Figure 7:
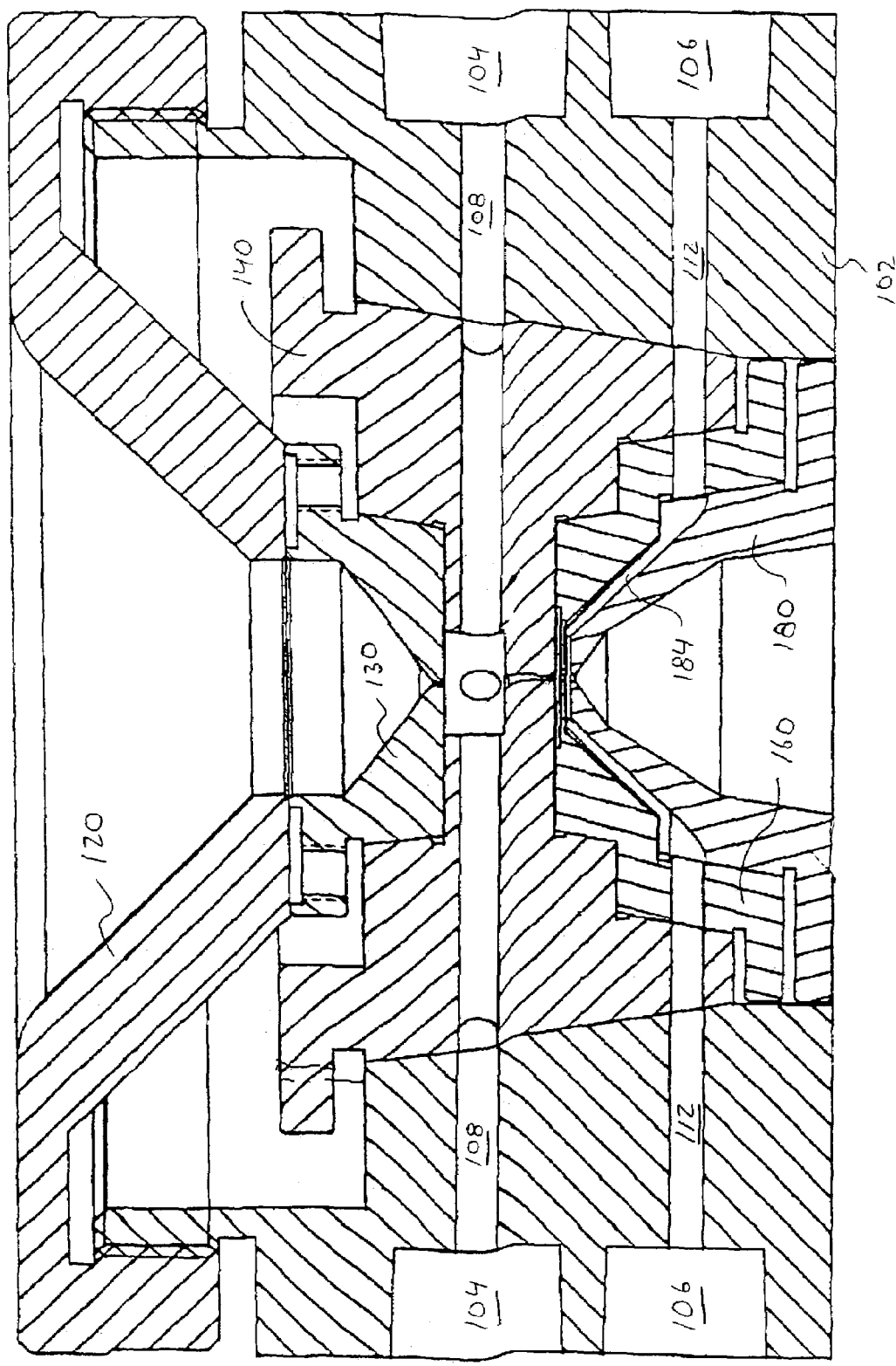
FIG. 7 is a cross-sectional view taken along line 6—6 of the applicator assembly as shown in FIG. 2.

The body portion 102 includes a primary coating source 104, a first primary coating port 108 (FIG. 7), a second primary coating port 110, a secondary coating source 106 (FIG. 7), and a secondary coating port 112 (FIG. 7). As shown in FIGS. 2 and 7, the first primary coating ports 108 of the body portion 102 feed into an annular groove 146 formed in the first primary die 140 adjacent to the body portion 102. The annular groove 146 is in fluid communication with first primary coating ports 108 formed in the first primary die 140. Second primary coating ports 110 formed in the body portion 102 are in fluid communication with the primary coating source 104 and corresponding second primary coating ports 110 formed in the first primary die 140. The secondary coating ports 112 formed in the body portion 102 are in fluid communication with the secondary coating source 106 and corresponding secondary coating ports 112 formed in the first primary die 140 and the second primary die 160, as best seen in FIG. 7. Note, although multiple primary coating sources 104 and secondary coating sources 106 are shown, embodiments of the applicator assembly 100 are envisioned wherein a single primary coating source 104 is in fluid communication with both the first primary coating ports 108 and the second primary coating ports 110. Similarly, embodiments are envisioned wherein a single secondary coating source 106 is utilized.

Figure 3:
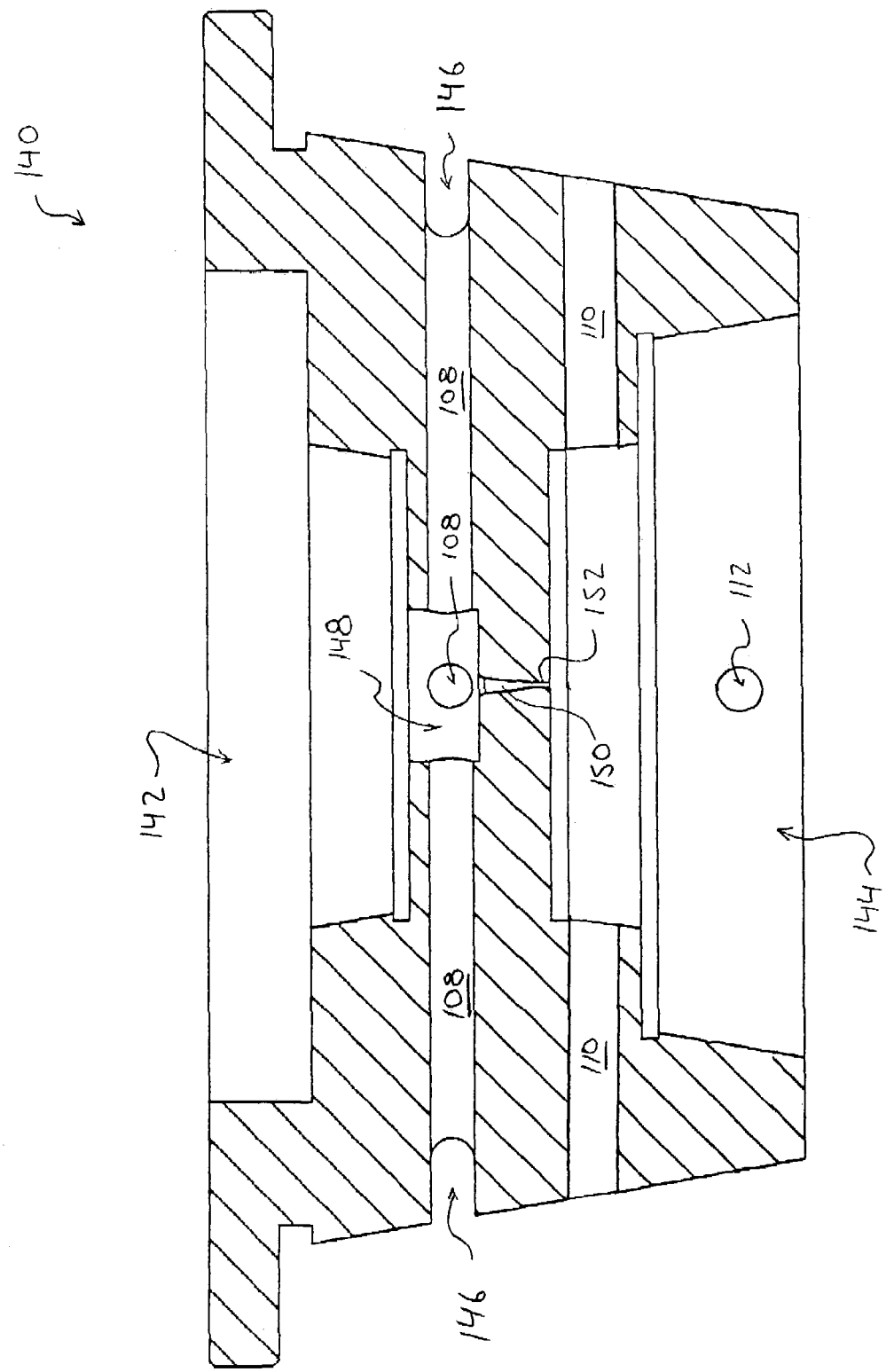
FIG. 3 is a cross-sectional view of a first primary coating die as shown in FIG. 2.

As shown in FIG. 3, the first primary die 140 includes a first cavity 142 and second cavity 144. The first cavity 142 is arranged and configured to receive an entry die 130 (FIG. 2). The entry die 130 includes an entry land 132 through which the optical fiber passes. The entry land 132 helps to ensure primary coating does not flow upwardly and out of the first primary coating reservoir 148. The second cavity 144 is arranged and configured to receive the second primary die 160 and the secondary die 180. As previously noted, the first primary die 140 includes an annular groove 146 and first primary coating ports 108. As shown, preferably, the first primary die 140 includes four first primary coating ports 108 extending radially from the first primary coating reservoir 148 to the annular groove 146, such that each first primary coating port 108 is perpendicular to adjacent first primary coating ports 108. This arrangement of first primary coating ports 108 allows for primary coating to be supplied to the first primary coating reservoir 148 in a manner that minimizes lateral forces exerted on an optical fiber disposed within the first primary coating reservoir 148. Adjacent the first primary coating reservoir 148 is a conical section 150 in which viscoelastic forces begin to form, thereby assisting in centering the optical fiber. Adjacent the conical section 150 is the first primary land 152. The first primary land 152 is arranged and configured such that the viscoelastic forces developed within the first primary land 152 center the optical fiber. The viscoelastic forces formed in the first primary land 152 maintain proper centering of the optical fiber throughout the applicator assembly 100. In certain preferred embodiments, the first primary land 152 has a length of approximately 25 to 35 mils, preferably 30 mils, and a width of approximately 7 to 15 mils, preferably less than approximately 13 mils.

Figure 10:
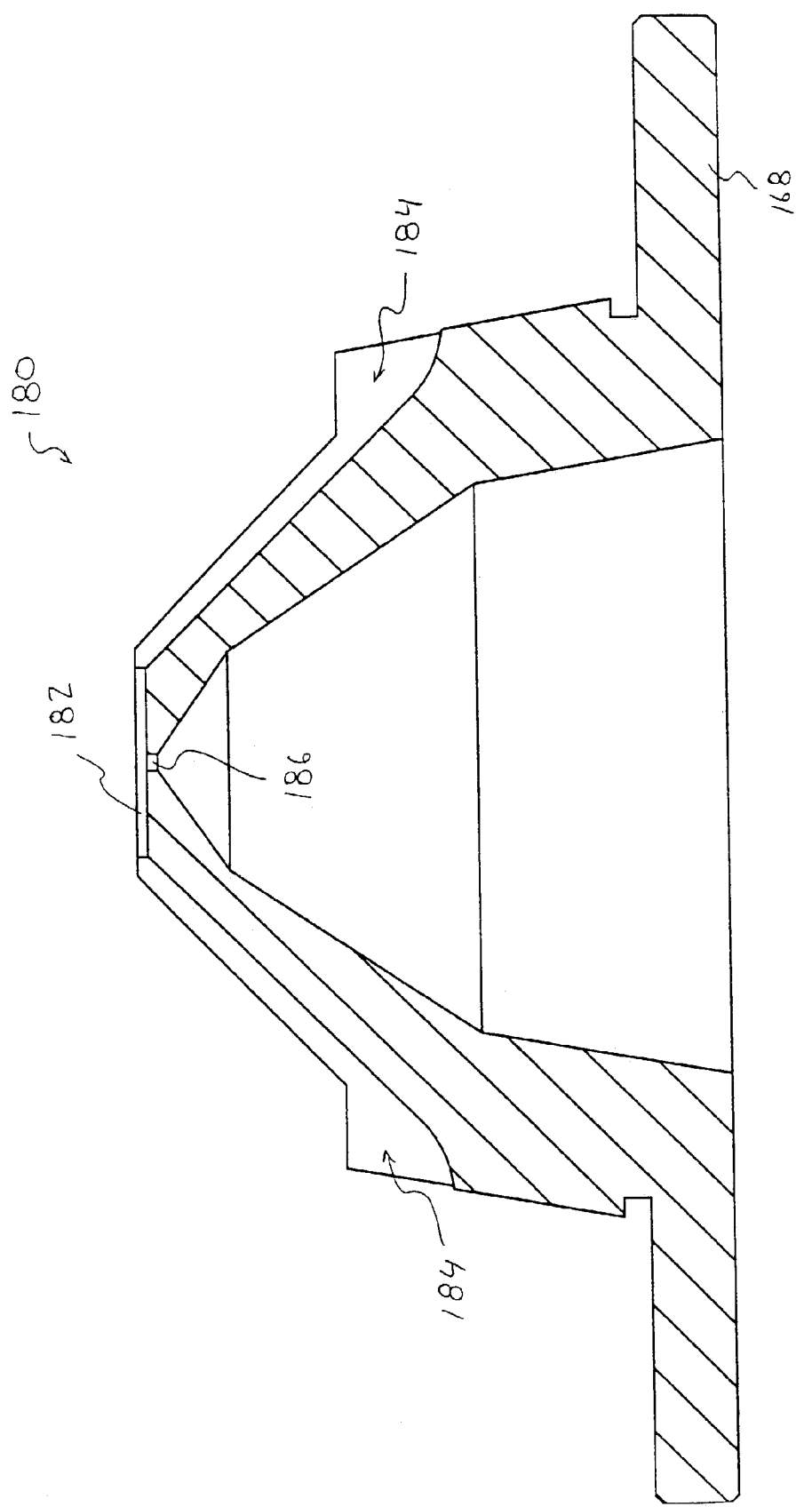
FIG. 10 is a cross-sectional view of the secondary die as shown in FIG. 7.

The second cavity 144 of the first primary die 140 is arranged and configured to receive the second primary die 160. As previously noted, the first primary die 140 includes second primary coating ports 110 that are aligned with corresponding second primary coating ports 110 disposed in the body portion 102. As will be discussed in greater detail hereinafter, the second primary coating ports 110 of the first primary die 140 are further aligned with second primary inlets 164 formed in the second primary die 160. As well, the first primary die 140 includes secondary coating ports 112 aligned with corresponding secondary coating ports 112 formed in the body portion 102 (FIG. 7). The secondary coating ports 112 are further aligned with secondary coating inlets 184 (FIG. 10).

Figure 4:
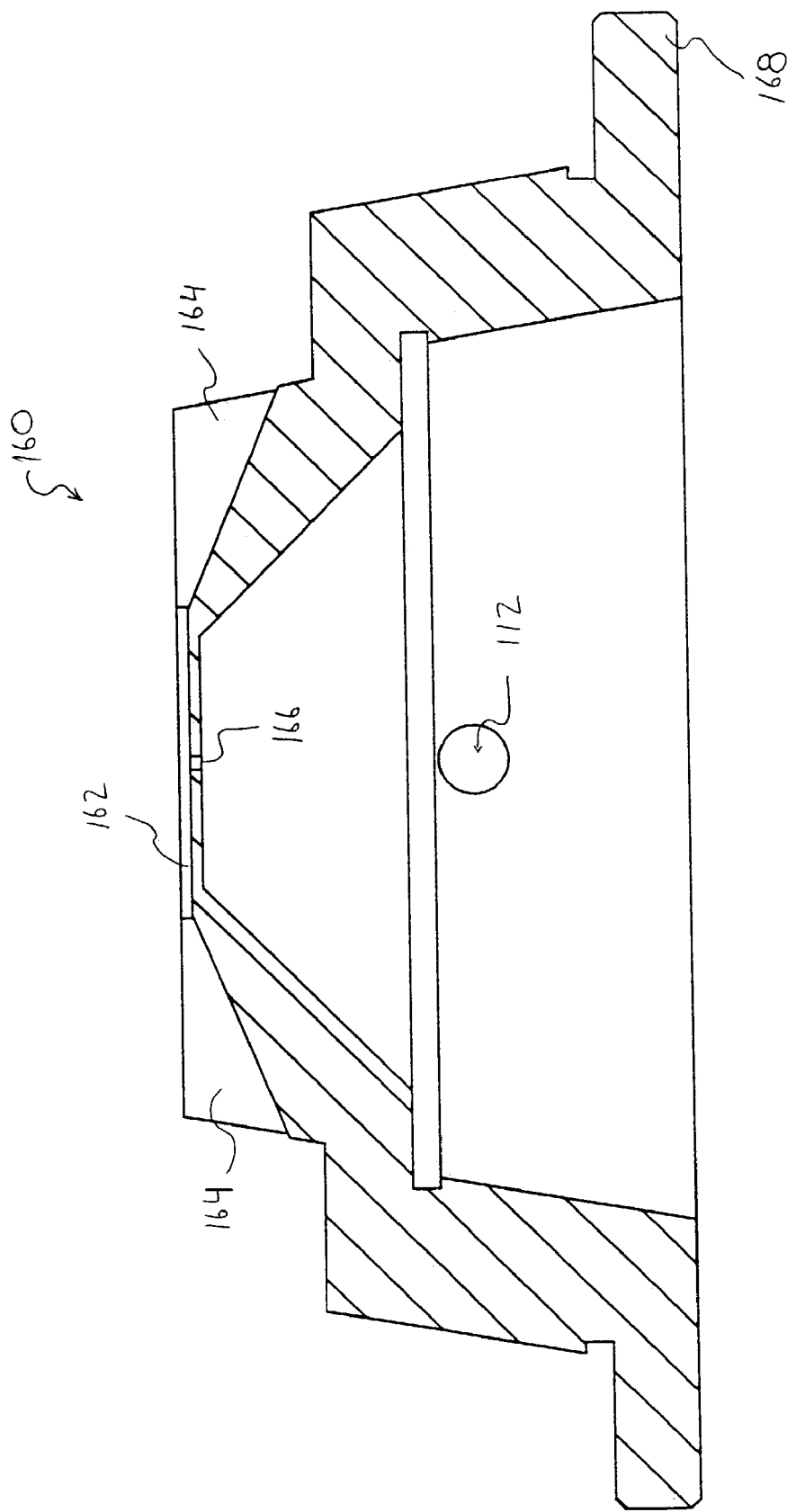
FIG. 4 is a cross-sectional view of a second primary coating die as shown in FIG. 2.

As shown in FIG. 4, the second primary die 160 includes a second primary reservoir 162, second primary inlets 164, and a second primary land 166. As noted above, the second primary inlets 164 are in fluid communication with the primary coating source 104 by way of the second primary coating ports 110. As such, the second primary reservoir 162 applies a second coat of primary coating to the first coat of primary coating applied to the optical fiber in the first primary coating reservoir 148 and sized by the first primary land 152. The second primary land 166 is sized such that the diameter of the second layer of primary coating can be adjusted by controlling the pressure of the primary coating source 104, as will be discussed in greater detail hereinafter. As centering forces are developed and controlled by way of the first primary land 152, maintaining centering of an optical fiber in the second primary die 160 is not of concern. In certain preferred embodiments, the second primary land 166 has a length of approximately 10 to 20 mils and a width of approximately 11 to 17 mils.

Figure 5:
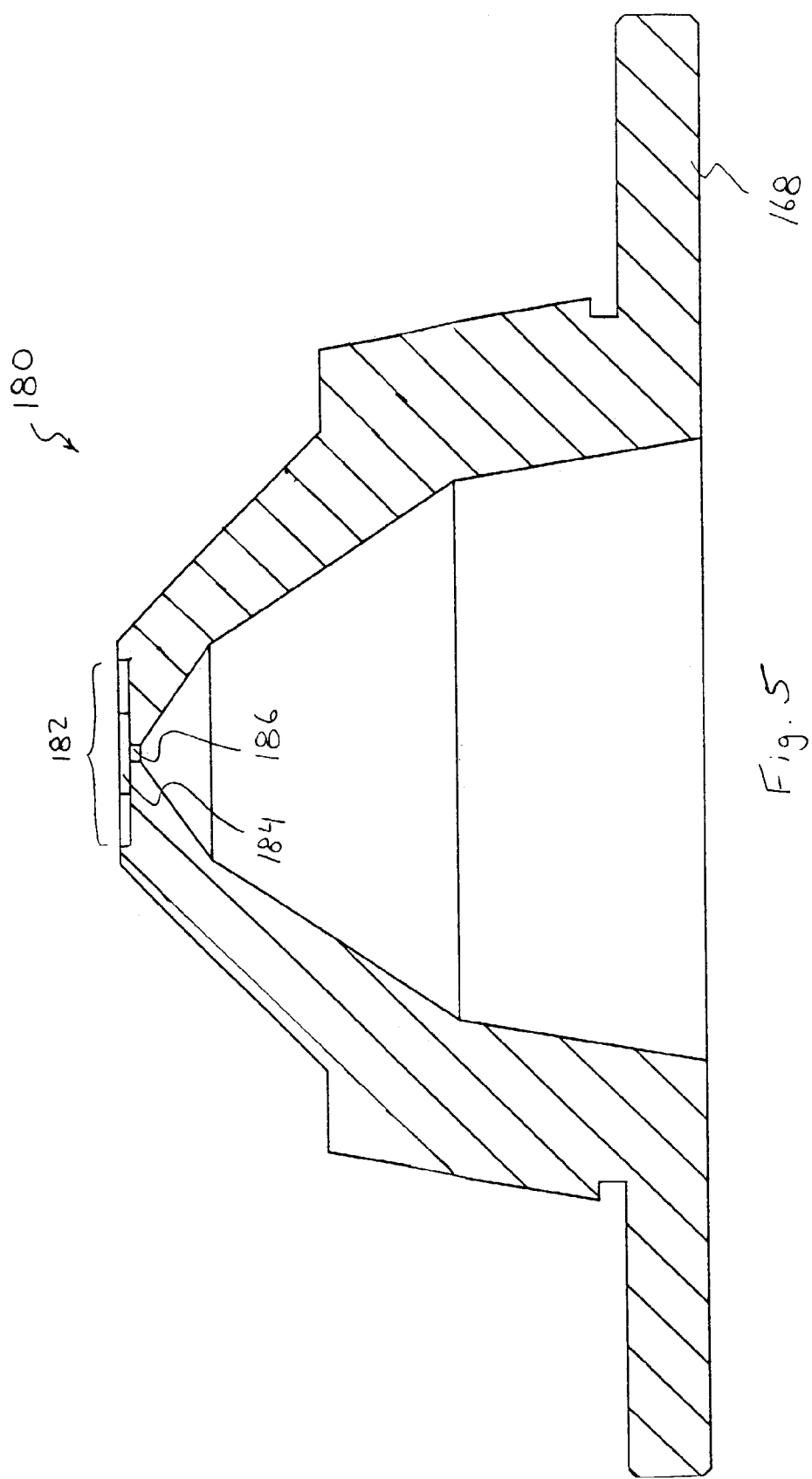
FIG. 5 is a cross-sectional view of a secondary coating die as shown in FIG. 2.

As shown in FIG. 5, the secondary die 180 includes a secondary coating reservoir 182, secondary coating inlets 184, and a secondary land 186. The secondary die 180 is received within the second primary die 160 such that the secondary inlets 184 are in fluid communication with the secondary coating ports 112 of the second primary die 160, as best seen in FIG. 7. As the optical fiber passes through the secondary coating reservoir 182, secondary coating is applied to the second coat of primary coating on the optical fiber. The optical fiber next passes through the secondary land 186, which is sized such that the diameter of the layer of the secondary coating can be adjusted by controlling the pressure of the secondary coating source 106. In certain preferred embodiments, the secondary land 186 has a length of approximately 10 to 20 mils and a width of approximately 15 to 22 mils. Preferably, the secondary die 180 and the second primary die 160 are secured in position by passing threaded fasteners through the retention flanges 168 on both of the dies 160 and 180 and threadably engaging mounting holes (not shown) disposed in the first primary die 140.

With reference to FIG. 6, the coating process of an optical fiber 101 using an applicator assembly 100 according to the present invention is discussed. The optical fiber 101 passes through the entrance die 130 and into the first primary coating reservoir 148 where the primary coating is contained under pressure. The diameter of the entry land 132 is preferably chosen such that it is sufficient to avoid optical fiber 101 impingement thereon and sufficiently narrow such that the pressurized primary coating in the primary coating reservoir 148 is effectively contained, rather than rising up through the entry land 132. As well, the diameter of the entry land 132 is selected such that air is prevented from entering the primary coating reservoir 148 and therefore the primary coating layer. The pressure at which the primary coating is applied serves two purposes including sealing the primary coating against the optical fiber at the entry land 132, thereby preventing bubble entrainment, and pushing the primary coating through the first primary land 152 to help maintain the diameter of the primary coating. As noted previously, the first primary land 152 is used to maintain centering of the optical fiber 101 by maximizing the viscoelastic forces generated therein that act on the optical fiber 101.

After passing through the first primary land 152, the optical fiber 101 enters the second primary reservoir 162 where a second layer of primary coating is applied to the optical fiber 101. As shown, the second primary reservoir 162 is formed between the first primary die 140 and the second primary die 160, adjacent the first primary land 152. The second primary reservoir 162 can either be fed by the same primary coating source 104 that feeds the first primary coating reservoir 148 or an independent primary coating source 104. Because centering forces throughout the applicator assembly 100 are maintained by the first primary land 152, the second primary land 166 can be sized with little regard to its effect on the centering forces exerted on the optical fiber 101. As such, the second primary land 166 can be sized such that the diameter of the second layer of primary coating can be controlled by the pressure at which the primary coating is applied. Therefore, the second layer of primary coating is applied to the optical fiber 101 in a fashion similar to the way the secondary coating is applied. An advantage of the disclosed arrangement is that the optical fiber 101 remains centered due to viscoelastic forces generated in the first primary land 152 while the primary coating pressure is utilized to determine the final diameter of the primary coating applied to the optical fiber 101. Because the diameter of the primary coating applied no longer depends on a fixed land diameter, the applicator assembly 100 can maintain a constant primary coating diameter over a much greater range of draw speeds.

Additionally, because the overall diameter of the primary coating applied to the optical fiber 101 is now adjusted by controlling the pressure of the coating, a simple algorithm regulating the primary coating pressure can be used to maintain the desired primary coating diameter. The pressure at which the primary coating is applied can be changed relatively rapidly compared to the previously noted factors for controlling the flow rate of primary coating (fiber temperature, coating temperature, etc.). Therefore, less ramp scrap is created during start up of the applicator assembly 100, as the applicator assembly 100 is much more responsive to varying draw speeds than is a typical applicator assembly wherein the thickness of the primary coating layer applied in a given primary die land is controlled by varying the flow rate of helium to an optical fiber chiller. Note, changing the pressure of the primary coating has minimal effect on sealing the primary coating against the optical fiber, so both the first primary coating reservoir 148 and the second primary coating reservoir 162 can be fed from a single pressurized primary coating source 104.

Figure 8:
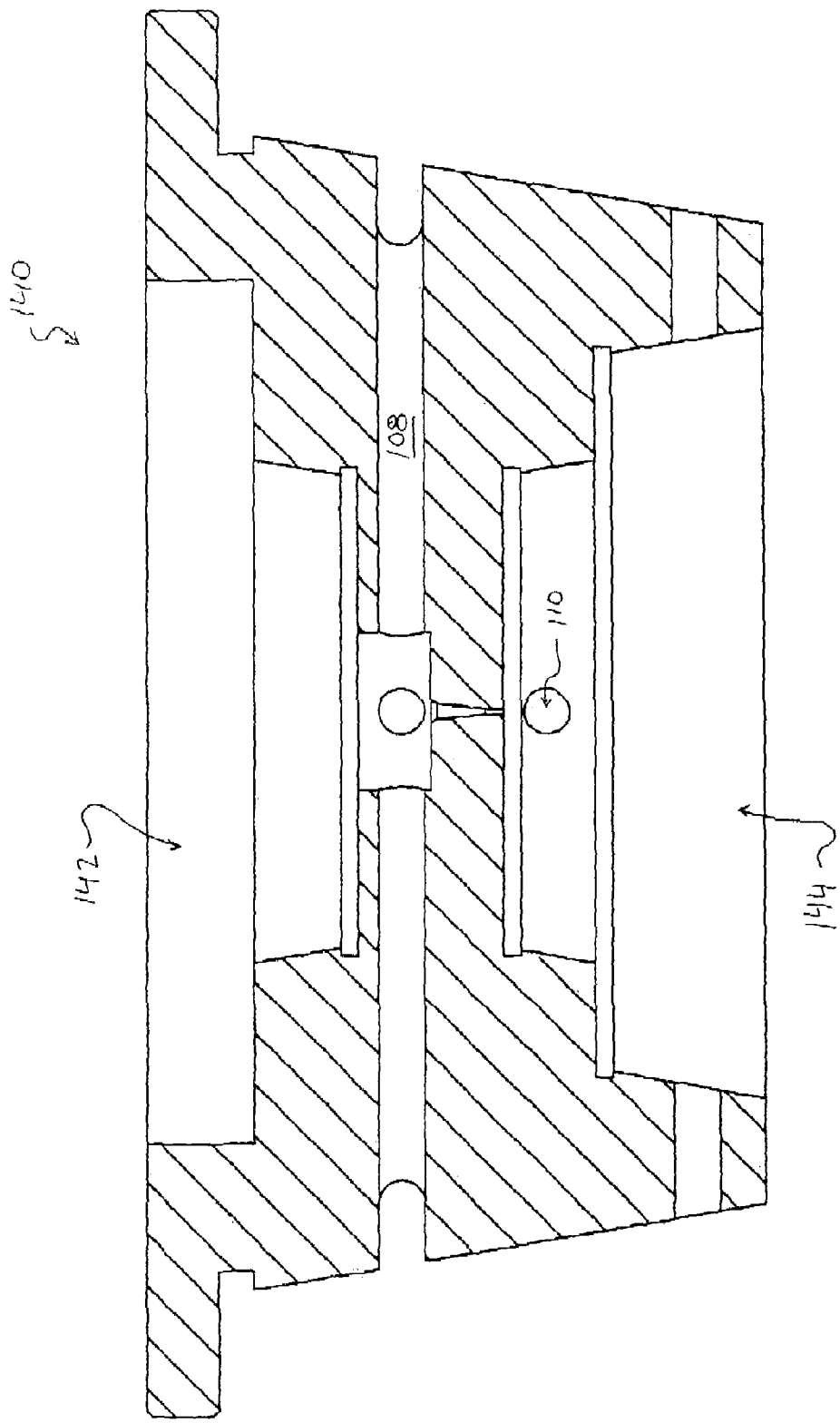
FIG. 8 is a cross-sectional view of the first primary die as shown in FIG. 7.
Figure 9:
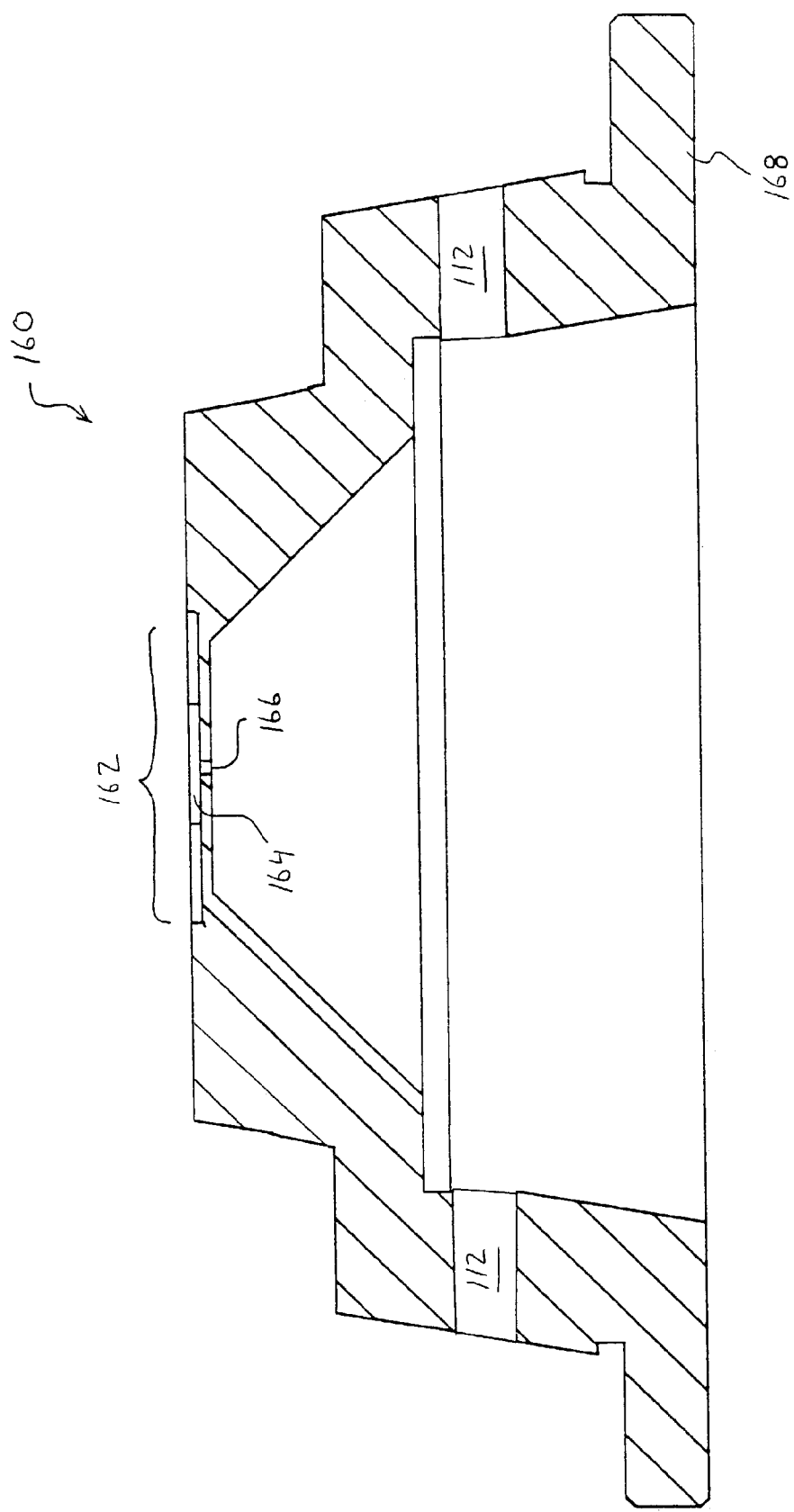
FIG. 9 is a cross-sectional view of the second primary die as shown in FIG. 7.

FIG. 7 is a cross-sectional view of the applicator assembly 100 taken along line 6—6 of FIG. 2, showing the entire cross section. FIGS. 8–10 are detailed cross sections of the first primary die 140, the second primary die 160, and secondary die 180, respectively, as shown in FIG. 7 and are presented for further clarification of the structure of a preferred embodiment of the present invention. Note, although FIGS. 2–10 show the primary coating applied in two layers and the secondary coating applied in a single layer, there is no intention to limit the applicator assembly to this configuration only. For example, embodiments are envisioned wherein the secondary coating is applied in multiple layers or coatings in addition to the primary and secondary coatings are applied in additional layers.

Figure 11:
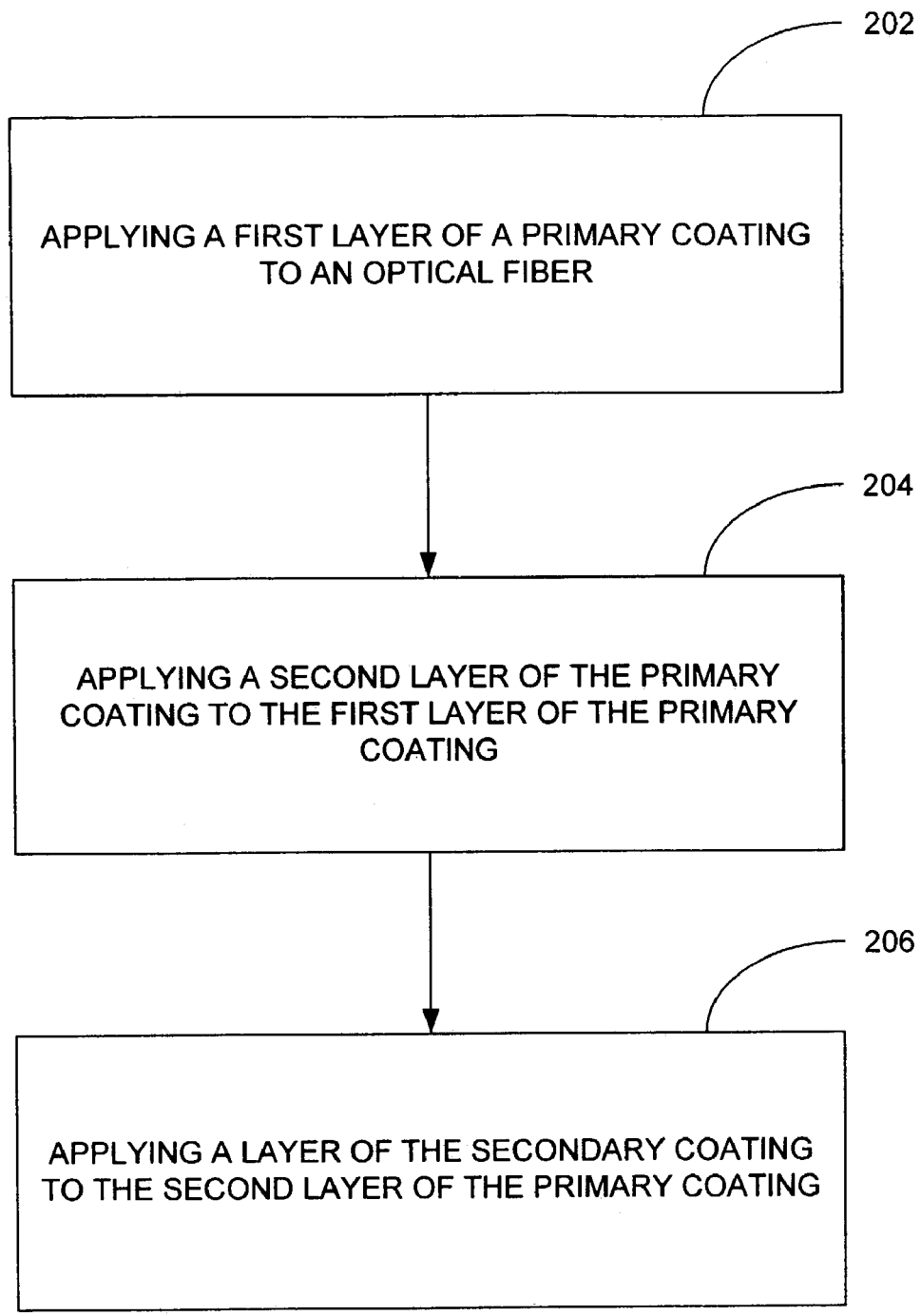
FIG. 11 is a flow diagram showing a preferred embodiment of a method of coating optical fibers according to the present invention.

The applicator assembly for applying a primary coating and a secondary coating to an optical fiber can also be viewed as providing a method of applying a primary coating and a secondary coating to an optical fiber. In this regard, as shown in FIG. 11, a representative method can be broadly summarized by the following steps: applying a first layer of the primary coating to the optical fiber (as shown in block 202), applying a second layer of the primary coating to the first layer of the primary coating (as shown in block 204), and applying a layer of the secondary coating to the second layer of the primary coating (as shown in block 206).

It should be emphasized that the above-described embodiments of the present applicator assembly 100, particularly, any "preferred" embodiments, are merely possible examples of implementations, merely set forth for a clear understanding of the principles of the applicator assembly 100. Many variations and modifications may be made to the above-described embodiment(s) of the applicator assembly 100 without departing substantially from the spirit and principles of the applicator assembly 100. All such modifications and variations are intended to be included herein within the scope of this disclosure and the present applicator assembly 100 and protected by the following claims.

What is claimed:

1. An applicator assembly for applying a primary coating and a secondary coating to an optical fiber, the assembly comprising:
at least one pressurized source of the primary coating;
a first primary reservoir for applying a first layer of the primary coating from the at least one pressurized source of the primary coating to the optical fiber;
a first primary die including a first primary land configured to size the first layer of the primary coating;
a second primary reservoir for applying a second layer of the primary coating to the optical fiber;
a second primary die including a second primary land;
a pressurized source of the secondary coating;
a secondary reservoir for applying a layer of the secondary coating from the pressurized source of the secondary coating to the optical fiber;
a secondary die including a secondary land configured to size the layer of the secondary coating; and
an entry die including an entry land, wherein the entry land, the first primary land, the second primary land, and the secondary land are substantially axially aligned, and wherein the first primary reservoir is disposed between the entry land and the first primary land, the second primary reservoir is disposed between the first primary land and the second primary land, and the secondary reservoir is disposed between the second primary land and the secondary land;
wherein the first primary land has a length of approximately 25 to 35 mils and a diameter of less than approximately 13 mils, the second primary land has a length of approximately 10 to 20 mils and a diameter of approximately 11 to 17 mils, and the secondary land has a length of approximately 10 to 20 mils and a diameter of approximately 15 to 22 mils.

2. The applicator assembly of claim 1, wherein the first primary reservoir and the second primary reservoir are supplied by a single pressurized source of primary coating.

3. The applicator assembly of claim 1, wherein the at least one pressurized source of primary coating further comprises a first and a second pressurized source of primary coating, the first pressurized source supplying the first primary reservoir and the second pressurized source supplying the second primary reservoir.

4. The applicator assembly of claim 1, wherein the first primary land is sized and configured to establish desired centering forces.

5. The applicator of claim 1, wherein the second primary land is sized and configured such that the diameter of second layer of the primary coating is determined by the pressure of the pressurized source of primary coating that supplies the second primary reservoir.

6. The applicator assembly of claim 1, wherein the first primary reservoir is in fluid communication with the first primary land, the second primary reservoir is adjacent to the first primary land and the second primary land, and the secondary reservoir is adjacent to the second primary land and the secondary land.

* * * * *